June 27, 1967     F. INGENERI     3,327,405
ELECTRICAL EDUCATIONAL AND AMUSEMENT DEVICE
Filed June 16, 1964     3 Sheets-Sheet 1
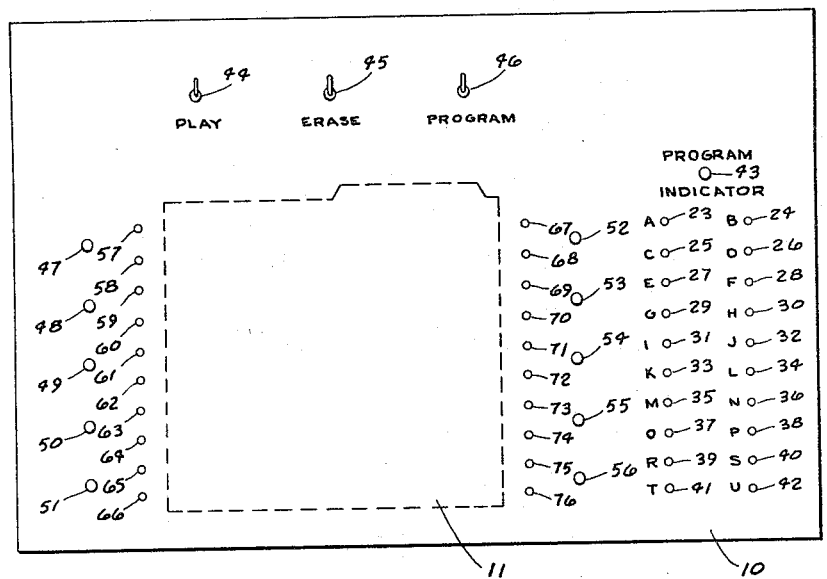
FIG._1
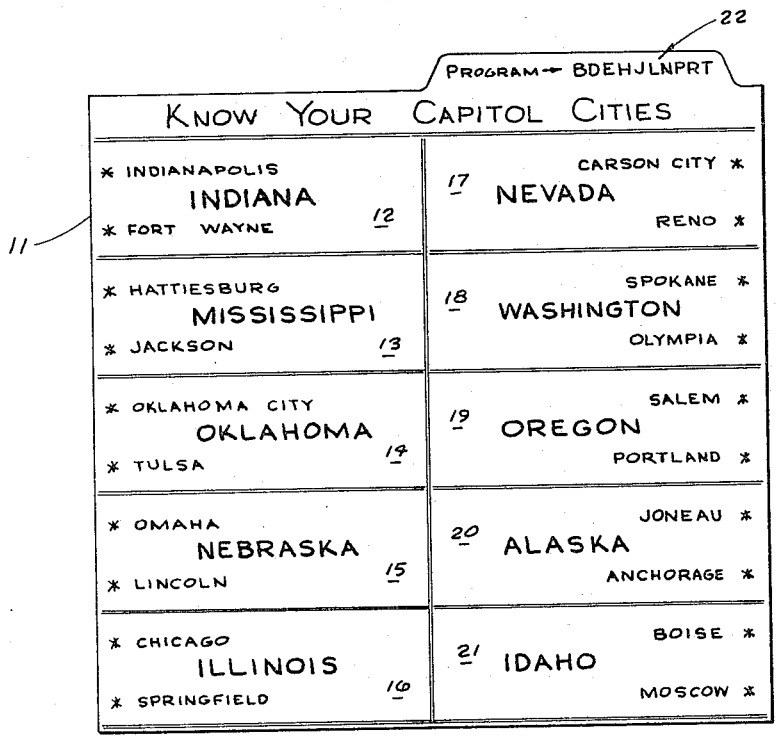
FIG._2
INVENTOR.
FRANK INGENERI
BY
Allen and Chromy

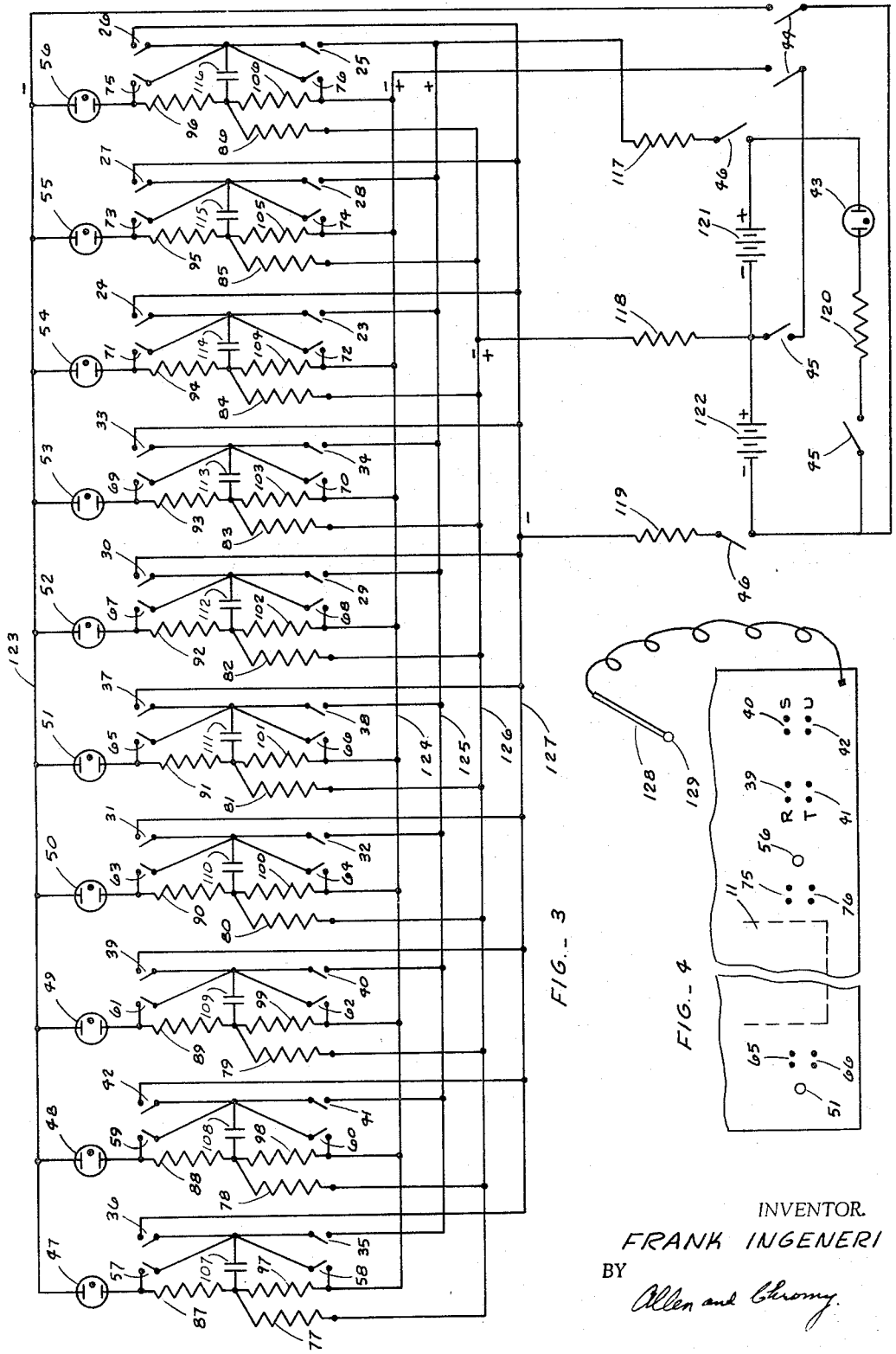

June 27, 1967  F. INGENERI  3,327,405
ELECTRICAL EDUCATIONAL AND AMUSEMENT DEVICE
Filed June 16, 1964  3 Sheets-Sheet 3
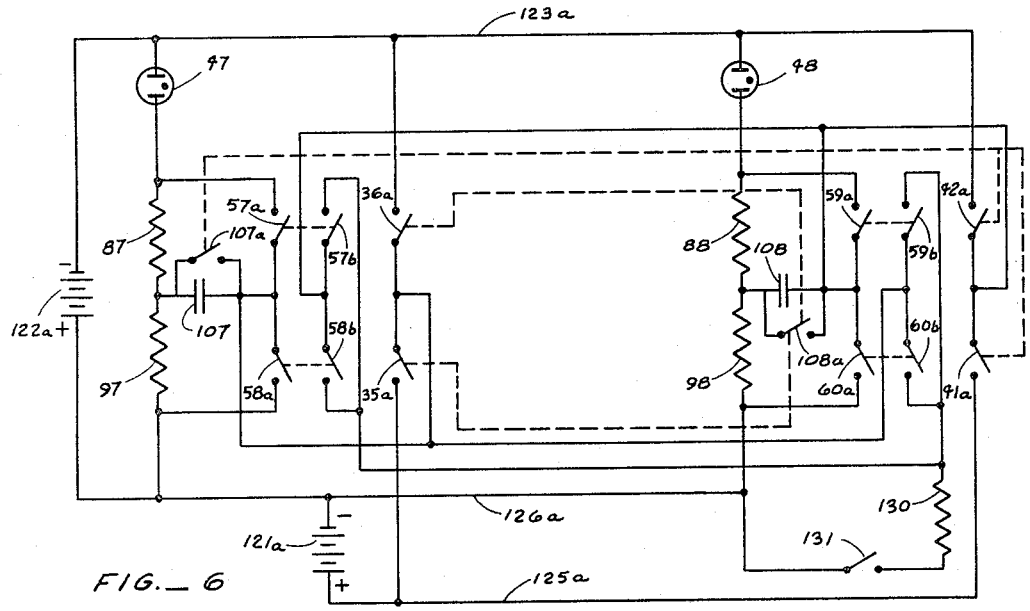
FIG.—6
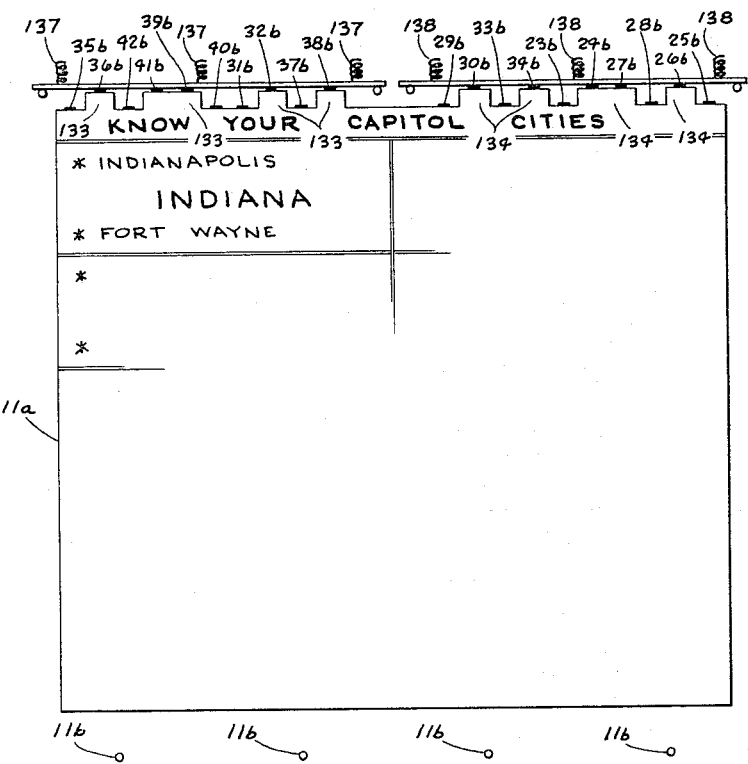
FIG.—5
INVENTOR.
FRANK INGENERI
BY
Allen and Chromy United States Patent Office 3,327,405
Patented June 27, 1967

1

3,327,405
ELECTRICAL EDUCATIONAL AND AMUSEMENT DEVICE
Frank Ingeneri, Santa Clara, Calif., assignor to On-The-Spot-TV, San Jose, Calif., a corporation of California
Filed June 16, 1964, Ser. No. 375,593
8 Claims. (Cl. 35—9)

This invention relates to an electrical educational and amusement device which may be programmed.

An object of this invention is to provied an improved educational device which may be programmed to test a person's knowledge of certain subjects.

Another object of this invention is to provide an improved electrical device that may be used either for educational or amusement purposes which may be programmed to provide a large variety of educational tests or games.

Still another object of this invention is to provide an improved electrical educational or amusement device which may be economically and efficiently manufactured so that it may be sold in a relatively low price range.

Still another object of this invention is to provide an improved educational and amusement device that is provided with a series of cards having a plurality of questions arranged thereon in a predetermined array, said cards being adapted to be positioned on the front of the device with the questions thereof aligned with indicating devices, said device also being provided with a programming circuit which is programmed in accordance with a code provided on the question card so that the indicating devices associated with the questions on the selected card may be energized either when the question is properly answered or incorrectly answered as manifested by the closing of selected circuits.

Other and further objects of this invention will be apparent to those skilled in the art to which it relates from the following specificaion, claims and drawing, in which briefly:

FIG. 1 is a plan view of the front of the cabinet housing an embodiment of this invention;

FIG. 2 is a plan view of a question card having an array of questions and the program code printed thereon;

FIG. 3 illustrates a schematic wiring diagram of the circuit of this apparatus;

FIG. 4 is a fragmentary detail view of a modified switch arrangement employed in accordance with this invention;

FIG. 5 is a fragmentary detail view of an automatic programming switching arrangement operable by notches or recesses provided to an edge of the question card; and FIG. 6 is a schematic wiring diagram showing modifications whereby this device may be changed from a two-choice device to a four-choice device and the person answering the questions printed on the question card has a selection of four choices instead of two.

Referring to the drawing in detail, reference numeral 10 designates the front panel of the cabinet for an embodiment of this invention showing the space provided for the program and question card 11 on the front thereof. The card 11 is provided with two columns of questions or information containing spaces. The left hand column includes spaces 12–16 and the right hand column includes spaces 17–21. Each of these spaces has an upper line and a lower line which are aligned with suitable electrical switches supported on the instrument panel 10 for the purpose to be described hereinafter.

The top part of the card 22 contains the program to be set into this device for the educational test or game to be performed for the specific card. This program, of course, varies with the different tests and games, and it is set into this instrument by closing the different push buttons 23–42 identified by the corresponding letters in the program. The switches 23–42 may be of any conven-

2 tional push button type, or each switch may be made up of a pair of contacts positioned close together so that they may be closed by the wand contact such as shown in FIG. 4. The switches 23–42 are designated by the letters A–U, respectively. Thus, the program indicated on the card 11 in FIG. 2, including the letters B, D, E, H, J, L, N, P, R, T would require that the following switches be closed momentarily, namely, 24, 26, 27, 30, 32, 34, 36, 38, 39 and 41.

Two rows of switches, each of which may also be a push button type, or may be of the type shown in FIG. 4, are provided in the play section of this device. The left hand row including switches 57–66 is positioned along the left hand side of the card 11, and the right hand row including switches 67–76 is positioned along the right hand side of this card. The switches in the left hand column are spaced so that they are in alignment with the upper and lower lines in the information spaces 12–16 of the card. Thus, the switch 57 is aligned with the top line of space 12 and switch 58 is aligned with the bottom line of space 12, and so on. The same arrangement is provided between the right hand column of switches and the upper and lower lines of information spaces 17–21 on the right hand side of the card. Thus, the top switch 67 is aligned with the upper line in space 17, and the switch 68 is aligned with the lower line in this space.

The apparatus of this invention is connected according to the diagram of connections shown in FIG. 3, and the same reference numerals as are employed in FIG. 1 are also shown in FIG. 3 to designate the corresponding indicator lights and switches. The indicator lights 47–56, which may be small neon type gas discharge tubes, are also shown in FIG. 3. A different one of these indicator lights is associated with each of the question spaces 12–21, respectively, shown on the card 11, and these indicator lights are provided for the purpose of indicating if the information supplied by the operator of this device, in response to the requested information of the card 11, is correct or false, as will be described hereinafter in the description of the operation of this apparatus.

One side of each of the indicator lights 47–56 is connected to line 123 going to one terminal of one section of the play switch 44. The lower terminal of this section of switch 44 is connected to the negative terminal of battery 122 and also to the left hand side of the neon gas discharge tube 43 through resistor 120 through one section of switch 45. Tube 43 is a voltage regulator connected across batteries 121 and 122 through resistor 120 and said one section of the on-off switch 45. The lower terminal of each of the indicator lights 47–56 is connected to the upper terminal of resistors 87–96, respectively, and to a terminal of switches 57, 59, 61, 63, 65, 67, 69, 71, 73 and 75, respectively. The lower terminals of resistors 87–96 are connected to the upper terminals of resistors 77–86, respectively, and the upper terminals of resistors 97–106, respectively, as well as to the left hand terminals of capacitors 107–116, respectively, which comprise the memory elements of this device. Resistors 77–86 may be eliminated in cases where the current supply sources 121 and 122 are connected together as shown. In such cases, the common connection between these current supply sources is connected to the lower terminal of resistors 97–106, as shown in the diagram of connections, FIG. 6, and through one section of each switch 44 and 45, as shown in FIG. 3.

The right hand terminal of capacitors 107–116 is connected to terminals of play switches 57–76 arranged in pairs. Thus, the right hand terminal capacitor 107 is connected to terminals of play switches 57 and 58. Right hand terminal of capacitor 108 is connected to terminals of play switches 59 and 60, and so on. The connections between the right hand terminals of capacitors 107–

116 and the various programming switches 23–42 are scrambled so that a person observing the program given at the top of the question card may not readily correlate this program with the programming switches and determine from this correlation the correct answers to the questions given on the question card 11. Thus, terminals of programming switches 35 and 36 are connected to capacitor 107; terminals of switches 41 and 42 are connected to capacitor 108; terminals of switches 39 and 40 are connected to capacitor 109; terminals of switches 31 and 32 are connected to capacitor 110; terminals of switches 37 and 38 are connected to capacitor 111; terminals of switches 29 and 30 are connected to capacitor 112; terminals of switches 33 and 34 are connected to capacitor 113; terminals of switches 23 and 24 are connected to capacitor 114; terminals of switches 27 and 28 are connected to capacitor 115; and terminals of switches 25 and 26 are connected to capacitor 116. Also, it will be noted that different programming switches of each pair may be associated with upper or lower ones of the play switches associated with the upper or lower choice to each question. Furthermore, the switch arrangement for the program switches may be further varied from the arrangement illustrated.

The programming switches 23–42 each have a terminal thereof connected to either one of the lines 125 or 127. The line 127 is connected through the resistor 119 and a section of switch 46 to the negative terminal of the battery 122, and line 125 is connected through resistor 117 and the other section 46 to the positive terminal of the battery 121. The negative terminal of battery 121 and the positive terminal of battery 122 are connected together to the upper terminal of switch 45 and to the lower terminal of the resistor 118 through which connection is made to the line 126. Line 126 is connected through the various resistors 77–86 to the left hand terminal of the respective capacitors 107–116. Thus, when the program control switch 46 is closed, the various programming switches 23–42 are enabled so that selected capacitors 107–116 may be charged therethrough, that is, electrical charges of predetermined polarities may be stored in the memory through selected switches 23–42, inclusive. Assuming that the program as printed on chart 11 in the tab 22 of FIG. 2 is to be followed, capacitor 114 receives a negative charge from line 127 by closing switch 24 momentarily; capacitor 116 is charged negatively by momentarily closing switch 26 to line 127; capacitor 115 is given a negative charge by closing switch 27 to line 27 momentarily; capacitor 112 is given a negative charge by momentarily closing switch 30 to line 127; capacitor 110 is given a positive charge by momentarily closing switch 32 to line 125; capacitor 113 is given a positive charge by momentarily closing switch 34 to line 125; capacitor 107 is given a negative charge by momentarily closing switch 36 to line 127; capacitor 111 is given a positive charge by momentarily closing switch 38 to line 125; capacitor 109 is given a negative charge by momentarily closing switch 39 to line 127; and capacitor 108 is given a positive charge by momentarily closing switch 41 to line 125.

This device is now programmed in accordance with the program given on the tab 22 in FIG. 2, and the program switch 46 is now opened and play switch 44 is closed. The device is now ready so that the operator thereof may test his knowledge of the questions given on card 11 which gives a list of States, and two choices as to which is the capital city of each State are given in spaces 12–21. The choices are aligned with the play switches 57–76. Thus, in space 12 there is given the State of Indiana and two cities, Indianapolis and Fort Wayne, positioned opposite to switches 57 and 58, respectively. The operator makes his selection as to which city is the capital of Indiana by pressing either switch 57 or switch 58.

It will be observed that when the play switch was closed, battery 122 was connected with negative terminal thereof to line 123, and the positive terminal thereof to line 124. Thus, the indicator lights 47–56 are biased by the potential of battery 122 with the top terminal of each of these indicator lights being negative with respect to the lower terminal. However, the potential of battery 122 is insufficient to fire these indicator lights, and the firing of the various indicator lights depends upon the proper closing of play switches 57–76. Thus, capacitor 107 was negatively charged through the momentary contact of switch 36 as previously described.

The charge of capacitor 107 may be impressed across resistor 87 by closing switch 57, or it may be applied across resistor 97 by closing switch 58. If switch 57 is closed, then the polarity of the charge of capacitor 107 is such that this charge assists the potential of battery 122 which is connected to bias the indicator light 47. As a result, the gas in this indicator light is fired. On the other hand, if switch 58 had been closed instead of switch 57, then the polarity of the charge of capacitor 107 would have been applied so as to buck the potential of battery 122, and the indicator light would not have been fired. In the case of capacitor 108 which received a positive charge through the momentary closing of switch 41, switch 60 must be closed in order to connect this capacitor across resistor 98 so that the charge of this capacitor assists the potential of battery 122 in firing indicator light 48. In the case of capacitors 109, 112, 114, 115 and 116, the upper play switches 61, 67, 71, 73 and 75, respectively, must be closed to utilize the charges of these capacitors for assisting ignition of tubes 49, 52, 54, 55 and 56, respectively. In the cases of capacitors 110, 111 and 113, lower play switches 64, 66, 70, respectively, must be closed in order to utilize the charges of capacitors 110, 111 and 113 to assist the potential of battery 122 in causing indicator lights 50, 51 and 53, respectively, to be ignited. It will be noted that the play switches which cause the indicator lights 47–56 to be ignited were positioned opposite the cities Indianapolis, Jackson, Oklahoma City, Lincoln, Springfield, Carson City, Olympia, Salem, Juneau and Boise, respectively, which correspond to the correct city selections to the questions given on the card 11.

In FIG. 6 there is shown a modified circuit arrangement which may be changed from a two-choice device to a four-choice device. The circuit shown in FIG. 3 provides for two choices to the answer of each question given on card 11, whereas, the circuit shown in FIG. 6 employs two positions provided with indicator lights 47 and 48, for example, which may be used in the same manner as the corresponding positions in the circuit shown in FIG. 3 simply by leaving the switch 131 shown in FIG. 6 in the open position. On the other hand, when the switch 131 is closed, the two positions shown in FIG. 6 may be made to function as one position of a four-choice device, the four choices being represented by the switches 57a–57b, 58a–58b, 59a–59b, and 60a–60b. A plurality of these four-choice circuit positions may be connected together the same as a plurality of two-choice positions are connected together, as shown in FIG. 3, simply by extending the lines 123a, 125a and 126a to interconnect additional similar circuit positions.

In the circuit shown in FIG. 6, when the switch 131 is closed and the circuit is used as a four-choice device, this position thereof may be programmed by momentarily closing any one of the programming switches 35a, 36a, 41a or 42a. If either switch 35a or 36a is closed, then a suitable electric charge, either of negative or positive polarity, is applied to capacitor 107, and at the same time a shorting switch 108a is connected momentarily across capacitor 108. Shorting switch 108a is mechanically coupled to switches 35a and 36a so that it is closed simultaneously therewith. On the other hand, if program switches 41a or 42a are closed to apply a suitable electric charge, either of negative or positive polarity to capacitor 108, shorting switch 107a, which is connected across capacitor 107, is momentarily closed since this shorting switch is mechanically coupled to programming switches 41a and 42a.

The battery 122a is connected with its negative terminal to line 123a and with its positive terminal to line 126a through switch 132, and this battery accordingly applies a bias potential across the indicator lights 47 and 48 through resistors 87–97 and 88–98, respectively. Switches 36a and 42a, when momentarily closed, are used for applying a negative charge to capacitors 107 and 108, respectively, from battery 122a. Switches 35a and 41a, when momentarily closed, are used for applying a positive charge to capacitors 107 and 108, respectively, from battery 121a. These switches 35a, 36a, 41a and 42a are therefor used in the programming of this device. Switches 57a–57b, 58a–58b, 59a–59b, and 60a–60b are referred to the play switches, and of these switches 57a and 57b are insulated from each other but mechanically coupled so that they are closed together. Likewise, switches 58a and 58b are also mechanically coupled, as are switches 59a and 59b, and switches 60a and 60b. Thus, in a four-choice device, the player may in answering the posed question close any pair of these play switches. If the device was programmed by closing switch 36a so that a negative charge is applied to capacitor 107, and capacitor 108 is left without a charge, then the player must close play switches 57a–57b in order to cause the indicator light 47 to be fired to indicate that he has properly answered the posed question.

Switches 57b, 58b, 59b and 60b are actuated in the operation or playing of this device simultaneously with switches 57a, 58a, 59a and 60a, respectively. Thus, switches 57b and 58b are used for discharging capacitor 108 in cases where play switch 57a or 58a is actuated in a wrong play. Also, switches 59b and 60b are employed for discharging capacitor 107 if play switches 59a and 60a, or either of them, are actuated in a wrong play. Thus, if capacitor 107 is provided with a negative charge by closing programming switch 36a, and if during the play of this device the operator closes play switch 60a which is mechanically coupled to switch 60b, then capacitor 107 will be discharged through the closing of switch 60b, and resistor 130, switch 131 which is closed, and resistor 97. Consequently, the operator of this device, after having momentarily closed play switch 60a cannot thereafter close play switch 57a and cause the firing of indicator light 47 by the discharge of capacitor 107 therethrough since this capacitor charge was dissipated in resistors 130 and 97 by the closing of switch 60b.

In FIG. 5 there is shown a detail view of a question card 11a that is provided with tabs 133 and 134 along one side thereof for actuating the selected programming switches. In this case, the programming switches comprise the flexible metal reeds 23b to 40b, inclusive. Selected ones of these flexible reeds are pressed by the tabs 133 and 134 against the metal conductors 135 and 136 which are spring-urged by the springs 137 and 138, respectively, toward the card 11a. Different cards will be provided with different configurations of tabs 133 and 134 to actuate different selected flexible reeds and press these against the conducting members 135 and 136 so that the device is programmed automatically instead of pressing push buttons 23–42 manually. Thus, the tabs 133 press flexible reeds 36b, 41b, 39b, 32b and 38b against the conducting member 135, and tabs 134 press the flexible reeds 30b, 34b, 24b, 27b and 26b against the conducting member 136 to program this device. The flexible reeds corresponding to the programming switches shown in FIG. 3 are designated by a similar reference numeral except that the suffix b has been added thereto. It is, of course, understood that after the flexible reeds have been pressed into contact with the conducting members 135 and 136 momentarily long enough to charge the capacitors of the device connected to these flexible reeds, the card 11a is retracted a short distance to engage the pins 11b so as to permit these flexible reeds to disengage themselves from the conducting members 135 and 136 after the capacitors connected thereto are charged and ready for the play operation.

While I have shown a preferred embodiment of the invention, it will be understood that the invention is capable of variation and modification from the form shown so that its scope should be limited only by the scope of the claims appended hereto.

What I claim is:

1. In an electrical education and amusement device, the combination of a plurality of electrical discharge devices connected to an electric circuit, a plurality of electrical storage devices, each of said electrical discharge device circuits having a storage device of said plurality of storage devices associated therewith, current supply means, programming means charging said storage devices from said current supply means in accordance with a predetermined pattern, and means applying electric charges of said storage devices to circuits of said electric discharge devices associated therewith to fire the electric discharge devices when the charges of said storage devices are applied to said circuits in accordance with a pattern related to said predetermined pattern.

2. In an electrical education and amusement device, the combination as set forth in claim 1 further characterized in that said electric discharge devices each comprise a gas discharge tube and said electric circuit includes impedance means connected in series with each of said gas discharge tubes and means connecting said current supply means to apply an electric potential across said gas discharge tubes and said impedance means.

3. In an electrical education and amusement device, the combination as set forth in claim 2 further characterized in that said electric charge applying means includes means discharging said storage devices through the impedance means of the related circuit to fire said tubes when the charges of said storage devices add to the electric potentials applied to the respective tubes.

4. In an electrical education and amusement device, the combination as set forth in claim 3 further characterized in that said impedance means comprises two impedance devices connected in series with each of said tubes and each of said storage devices has one terminal connected to the common connection between two impedance devices of an associated circuit and said charge applying means comprises switches connecting each of said storage devices across either of the two impedance devices of an associated circuit so the charge thereof either adds to or subtracts from the electric potential across the impedance devices and the tube associated therewith is fired when said charge adds to said potential.

5. In an electrical educational and amusement device, the combination of means having a plurality of questions together with a multiple choice of answers arranged thereon in a predetermined array and including a programming code, electrical indicating means correlated with said questions, a memory comprising a plurality of electrical storage devices, programming means for applying electrical charges of predetermined polarities to said storage devices in accordance with said programming code, means for applying a biasing potential to each of said indicating devices, and selection means positioned adjacent said questions for selectively applying electrical charges of said storage devices to said indicating means to indicate when correct answers to said questions are selected by said selection means.

6. In an electrical educational and amusement device, the combination of means having a plurality of questions together with a multiple choice of answers arranged thereon in a predetermined array and including a programming code, a plurality of indicating devices arranged so that at least one of said devices corresponds to each of said questions, a memory comprising a plurality of electrical storage devices, each of said indicating devices having one of said storage devices associated therewith, programming means for applying electrical charges of predetermined polarities to said storage devices in accordance with said programming code, and means correlated with said questions for selectively applying electrical charges of said storage devices to said indicating devices, said last mentioned means to permit firing of said indicating devices only when the correct polarity electrical charges are applied thereto.

7. In an electrical educational and amusement device, the combination of means having a plurality of questions together with multiple choice answers arranged thereon in a predetermined array and including a programming code, a plurality of indicating devices arranged so that at least one of said devices corresponds to each of said questions, a potential source, a memory comprising a plurality of electrical storage devices, a plurality of resistors, selected ones of said resistors being connected in series with selected ones of said indicating devices and across said source of potential to apply said potential as a bias to said indicating devices, programming means for applying electrical charges to said storage devices in accordance with said programming code, and means correlated with said questions for selectively applying electrical charges of said storage devices to selected ones of said resistors to fire the ones of said indicating devices in which said electrical charges augment the bias potential.

8. In an electrical educational and amusement device, the combination of means having a plurality of questions together with multiple choice answers arranged thereon in a predetermined array and including a programming code, a plurality of indicating devices arranged so that at least one of said devices corresponds to each of said questions, a potential source connected to each of said indicating devices for biasing said devices, a memory comprising a plurality of electrical storage devices, each of said indicating devices having one of said storage devices connected thereto, programming means for applying electrical charges of predetermined polarities to said storage devices in accordance with said programming code, and means correlated with said questions for selectively applying electrical charges of said storage devices to said indicating devices to fire the ones of said indicating devices to which the correct polarity electrical charges are applied.

References Cited
UNITED STATES PATENTS

| | | | |
|---|---|---|---|
| 1,949,783 | 3/1934 | Cleaver | 35—12 |
| 3,121,959 | 2/1964 | Uttal | 35—9 |
| 3,141,243 | 7/1964 | Chapman | 35—9 |

EUGENE R. CAPOZIO, *Primary Examiner.*

R. E. KLEIN, N. NEILEIN, *Assistant Examiners.*